United States Patent
Morihashi et al.

(10) Patent No.: US 11,435,723 B2
(45) Date of Patent: Sep. 6, 2022

(54) CONTROL DEVICE FOR MACHINE TOOLS AND MACHINE TOOL CONTROL METHOD

(71) Applicant: FANUC CORPORATION, Yamanashi (JP)

(72) Inventors: Ryou Morihashi, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 37 days.

(21) Appl. No.: 16/951,024

(22) Filed: Nov. 18, 2020

(65) Prior Publication Data

US 2021/0181718 A1 Jun. 17, 2021

(30) Foreign Application Priority Data

Dec. 16, 2019 (JP) .............................. JP2019-226792

(51) Int. Cl.
*G05B 19/416* (2006.01)
*G05B 19/404* (2006.01)

(52) U.S. Cl.
CPC ....... *G05B 19/4166* (2013.01); *G05B 19/404* (2013.01); *G05B 2219/37355* (2013.01); *G05B 2219/49077* (2013.01)

(58) Field of Classification Search
CPC .............. G05B 19/4166; G05B 19/404; G05B 2219/37355; G05B 2219/49077;
(Continued)

(56) References Cited

U.S. PATENT DOCUMENTS

2009/0107308 A1* 4/2009 Woody .................... B23B 25/02
82/1.11
2011/0133681 A1* 6/2011 Okita ..................... G05B 19/19
318/561
(Continued)

FOREIGN PATENT DOCUMENTS

JP 2019-040252 A 3/2019

*Primary Examiner* — Kenneth M Lo
*Assistant Examiner* — Mohammed Shafayet
(74) *Attorney, Agent, or Firm* — Studebaker & Brackett PC

(57) ABSTRACT

A control device for machine tools according to an aspect of the present disclosure controls a machine tool which cuts the workpiece by way of the cutting tool by causing the spindle and the feed axis to cooperatively act, the control device including: a feed command calculation unit which calculates a feed command for causing the feed axis to relatively move in relation to the workpiece; an oscillation phase calculation unit which calculates an oscillation phase that is a phase of oscillation to cause the feed axis to reciprocally move based on a rotation number of the spindle; an oscillation phase compensation unit which compensates the oscillation phase; an oscillation amplitude calculation unit which calculates an oscillation amplitude that is an amplitude of oscillation causing the feed axis to reciprocally move based on the feed command; an oscillation command calculation unit which calculates an oscillation command causing the feed axis to reciprocally move, based on the oscillation amplitude and the oscillation phase after compensation by the oscillation phase compensation unit; and a command synthesizing unit which calculates a synthetic command for driving the feed axis by superimposing the feed command and the oscillation command.

7 Claims, 5 Drawing Sheets

(58) Field of Classification Search
CPC .......... G05B 19/19; G05B 2219/45044; G05B 2219/49384; G05B 2219/45136
See application file for complete search history.

(56) References Cited

U.S. PATENT DOCUMENTS

| | | | |
|---|---|---|---|
| 2015/0168938 A1* | 6/2015 | Fujimoto | G05B 19/4163 |
| | | | 700/160 |
| 2016/0266567 A1* | 9/2016 | Watanabe | G05B 19/4103 |
| 2017/0285608 A1* | 10/2017 | Sonoda | G05B 19/40938 |
| 2018/0281090 A1* | 10/2018 | Watanabe | G05B 19/186 |
| 2018/0297163 A1* | 10/2018 | Sonoda | B23Q 15/0075 |

* cited by examiner

CONTROL DEVICE FOR MACHINE TOOLS AND MACHINE TOOL CONTROL METHOD

BACKGROUND OF THE INVENTION

This application is based on and claims the benefit of priority from Japanese Patent Application No. 2019-226792, filed on 16 Dec. 2019, the content of which is incorporated herein by reference.

FIELD OF THE INVENTION

The present invention relates to a control device for machine tools, and a machine tool control method.

RELATED ART

Conventionally, machine tools such as lathes, for example, are being used which have a spindle that causes a cutting tool and a workpiece to relatively rotate, and a feed axis that causes the cutting tool and the workpiece to relatively move in a predetermined feed direction, and cuts the workpiece by way of the cutting tool by causing the spindle and feed axis to cooperatively act.

With such a machine tool such as a lathe, since the cutting edge of the cutting tool continuously scrapes off material of the surface of the workpiece, there is a possibility of (chips) the material scraped off becoming elongated shavings, and sticking to the cutting tool and inhibiting machining of the workpiece. In contrast, as disclosed in Patent Document 1, for example, a technique has been known which uses a numerical control device to perform oscillation cutting that causes the cutting tool to reciprocally move relative to the workpiece at a predetermined oscillation frequency. In oscillation cutting, the cutting tool is made to reciprocally move such that the trajectory of the cutting tool in the $i^{th}$ rotation of the spindle and the trajectory of the cutting in the $(i+1)^{th}$ rotation intersect. Since the cutting tool periodically distances from the workpiece, it is thereby possible to shred the shavings in a fixed length.

Patent Document 1: Japanese Unexamined Patent Application, Publication No. 2019-40252

SUMMARY OF THE INVENTION

In oscillation cutting disclosed in Patent Document 1, a command for relatively feeding the cutting tool and workpiece is calculated by superimposing a sinusoidal oscillation command on a linear feed command. In the case of superimposing the sinusoidal oscillation command on the feed command of constant speed, the spindle phase at which the oscillation command becomes a peak or valley is shifted relative to the spindle phase at which the trajectory of the position of the cutting tool becomes the apex of the peak (maximum point of coordinate values), or lowest point of the valley (minimum point of coordinate values), with the feed direction as the vertical direction. In other words, the point at which the position of the cutting tool becomes a peak becomes somewhat more to the rear side in the spindle rotation direction than the point of the peak of the oscillation command, and the point at which the position of the cutting tool becomes a valley becomes somewhat more to the front side in the spindle rotation direction than the point of the valley of the oscillation command.

With the cutting tool, a pattern caused by motion of the cutting tool called sawn lines which are identified in the cutting surface can be formed. In the oscillation cutting disclosed in Patent Document 1, by the spindle angle at which the cutting tool position becomes the apex of the peak in the $i^{th}$ rotation of the spindle and the spindle angle at which the cutting tool position becomes the lowest point of the valley in the $(i+1)^{th}$ rotation being shifted, there are cases where sawn lines become more noticeable, due to the time for which the cutting tool is distanced from the workpiece increasing, and idling becoming larger. For this reason, a control device for machine tools which can perform oscillation cutting in which sawn lines are hardly noticeable has been desired.

A control device for machine tools according to an aspect of the present disclosure controls a machine tool having a spindle that causes a cutting tool and a workpiece to relatively rotate, and a feed axis which causes the cutting tool and the workpiece to relatively move, and which cuts the workpiece by way of the cutting tool by causing the spindle and the feed axis to cooperatively act, the control device including: a feed command calculation unit which calculates a feed command for causing the feed axis to relatively move in relation to the workpiece; an oscillation phase calculation unit which calculates an oscillation phase that is a phase of oscillation to cause the feed axis to reciprocally move based on a rotation number of the spindle; an oscillation phase compensation unit which compensates the oscillation phase; an oscillation amplitude calculation unit which calculates an oscillation amplitude that is an amplitude of oscillation causing the feed axis to reciprocally move based on the feed command; an oscillation command calculation unit which calculates an oscillation command causing the feed axis to reciprocally move, based on the oscillation amplitude and the oscillation phase after compensation by the oscillation phase compensation unit; and a command synthesizing unit which calculates a synthetic command for driving the feed axis by superimposing the feed command and the oscillation command.

According to the present invention, it is possible to perform oscillation cutting for which sawn lines are hardly noticeable.

DETAILED DESCRIPTION OF THE INVENTION

Figure 1:
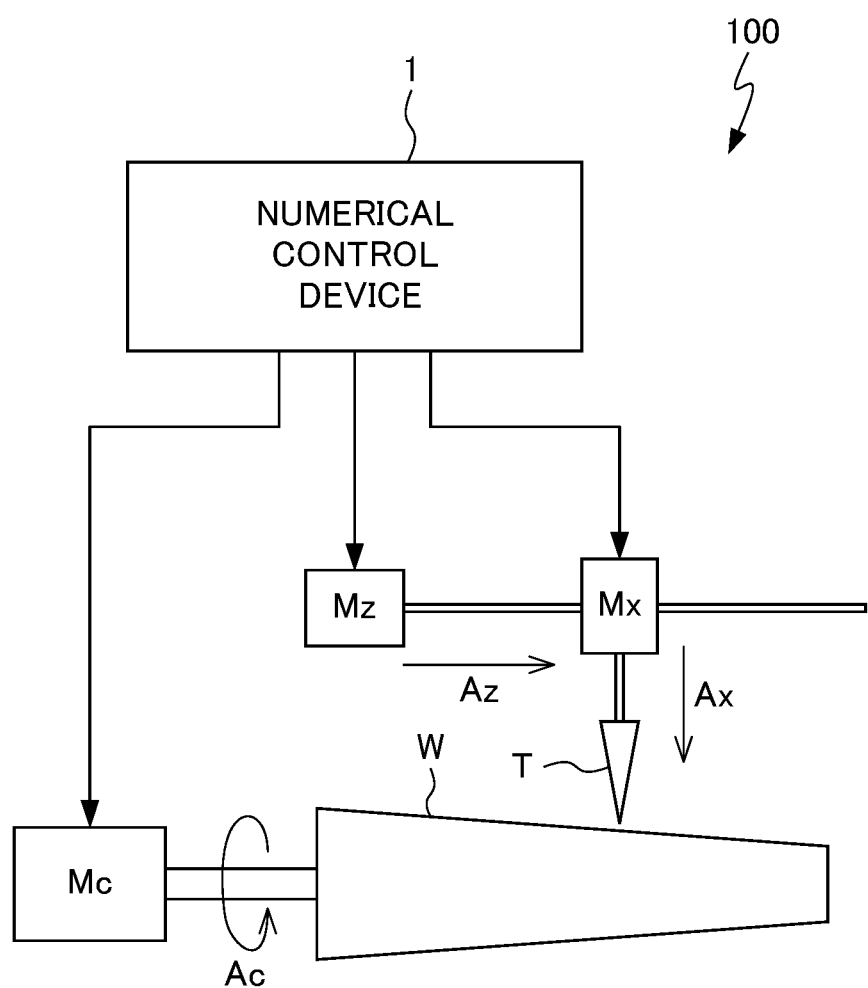
FIG. 1 is a schematic view showing the configuration of a machine tool equipped with a numerical control device according to a first embodiment of the present disclosure.

Hereinafter, an embodiment of the present disclosure will be explained while referencing the drawings. FIG. 1 is a schematic view showing the configuration of a machine tool 100 equipped with a numerical control device 1 which is a first embodiment of a control device for machine tools according to the present disclosure.

The machine tool 100 is an NC lathe that cuts a workpiece W, which is a machining target using a cutting tool T. The machine tool 100 has the three drive axes of a spindle Ac that causes a cutting tool T or workpiece W to rotate (in the present embodiment, rotates the workpiece W); a feed axis Az that causes the cutting tool T to relatively move (in the present embodiment, moves the cutting tool T) in a direction parallel to the rotation axis of the spindle Ac relative to the workpiece W; and a cut-in axis Ax that causes the cutting tool T to relatively move (in the present embodiment, moves the cutting tool T) in the radial direction of the spindle Ac relative to the workpiece W. For this reason, the machine tool 100 has drive motors (spindle motor Mc, feed axis motor Mz and cut-in axis motor Mx) which drive these drive axes Ac, Az, Ax.

The numerical control device 1 controls the machine tool 100 so as to cut the workpiece W by the cutting tool T by causing the spindle Ac, feed axis Az and cut-in axis Ax to cooperatively act. The numerical control device 1 can be realized by causing the appropriate program to be executed in a computer device equipped with a CPU, memory, etc.

Figure 2:
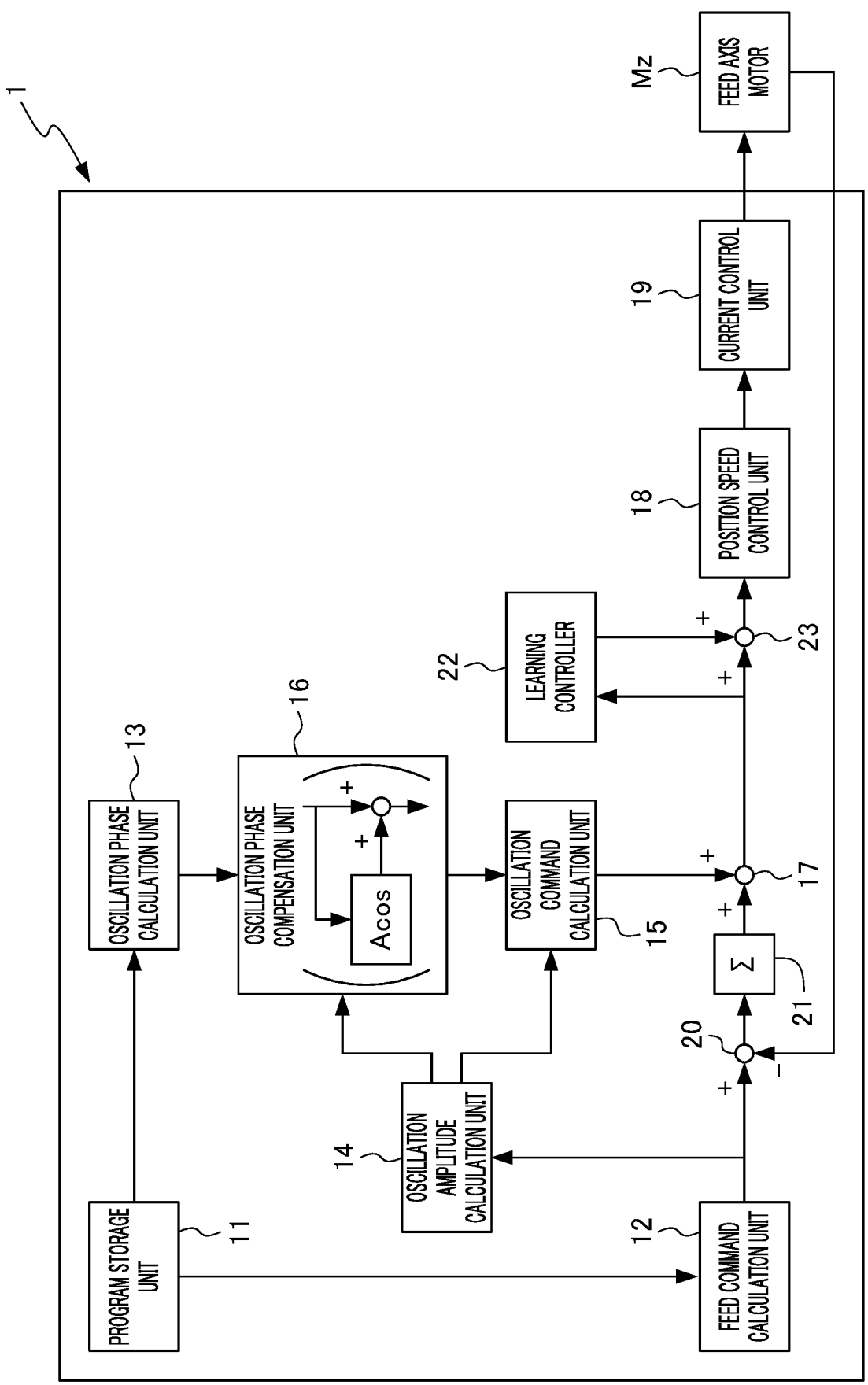
FIG. 2 is a block diagram showing a detailed configuration and the flow of signals related to control of a feed axis motor of the numerical control device of FIG. 1.

The numerical control device 1, as shown in FIG. 2, includes: a program storage unit 11 which stores machining programs; a feed command calculation unit 12 which calculates a feed command causing a feed axis Az to move; an oscillation phase calculation unit 13 which calculates an oscillation phase that is a phase of oscillation of the feed axis Az based on a rotation number of the spindle Ac; an oscillation amplitude calculation unit 14 which calculates an amplitude of oscillation causing the feed axis to reciprocally move based on the feed command; an oscillation command calculation unit 15 which calculates an oscillation command causing the feed axis Az to reciprocally move periodically, based on the oscillation phase and the oscillation amplitude; an oscillation phase compensation unit 16 which compensates the oscillation phase calculated by the oscillation phase calculation unit 13; and a command synthesizing unit 17 which calculates a synthetic command for driving the feed axis Az by superimposing the feed command and the oscillation command. Furthermore, the numerical control device 1 includes: a position speed control unit 18, a current control unit 19, a position deviation calculation unit 20, integrator 21, a learning controller 22, and a learning compensation value adding unit 23. These constituent elements are distinguished functionally, and may not necessarily being able to clearly distinguish in a physical configuration and program configuration.

The program storage unit 11 stores machining programs. The machining programs can be written according to G-code or the like, for example.

The feed command calculation unit 12 calculates the feed command causing the feed axis Az to move in accordance with the machining program. This feed command indicates the Z direction position of the cutting tool T at every time, and can establish a command in which the Z direction position of the cutting tool T linearly increases with time. More specifically, when defining the feed amount of the feed axis Az (cutting tool T) per one rotation of the spindle Ac as F (mm), the rotation number of the spindle Ac as S (rpm), and the time as t (sec), in the case of the feed speed of the feed axis Az being constant, the feed command calculation unit 12 can be calculated by the following formula (1).

$$Ps(t) = (FS/60) \cdot t \qquad (1)$$

The oscillation phase calculation unit 13 calculates the phase of oscillation (oscillation phase) θ(t) (rad) at which causing the feed axis Az to reciprocally move in a cycle according to the rotation speed of the spindle Ac. The oscillation phase calculation unit 13 can calculate the oscillation phase θ(t) as a value proportional to time. More specifically, the oscillation phase θ(t) can be calculated by the following formula (2), using the constant (frequency multiplying factor) I designating the reciprocating movement frequency of the feed axis per one rotation of the spindle Ac. When I is set as 0.5+m (non-negative integer), it is possible to shred chips efficiently.

$$\theta(t) = (2\pi SI/60) \cdot t \qquad (2)$$

The oscillation amplitude calculation unit 14 calculates the amplitude A of oscillation causing the feed axis Az to reciprocally move in the cycle according to the rotation speed of the spindle Ac. More specifically, the oscillation amplitude A can calculate the feed amount of the feed axis Az (cutting tool T) per one rotation of the spindle Ac by the following formula (3), using F (mm) and constant (oscillation amplitude magnifying factor) K (real number greater than 1).

$$A = KF/2 \qquad (3)$$

The oscillation command calculation unit 15 calculates the oscillation command Po(t) causing the feed axis Az to reciprocally move, based on the oscillation phase θ(t) (oscillation phase θ(t) after compensated by the oscillation phase compensation unit 16 described later). The oscillation command Po(t) can be expressed as an oscillation component (displacement from position in case of no oscillation) of the position of the feed axis Az for every time. The oscillation command calculation unit 15 can establish the oscillation command Po(t) as a value obtained by multiplying a constant (oscillation amplitude) A (mm) by the sine (sin θ) or cosine (cos θ) of the oscillation phase θ(t). In addition, the oscillation command calculation unit 15 for preventing notching by oscillation may offset the oscillation command Po(t) so that the maximum value of the oscillation component becomes "0". More specifically, the oscillation command calculation unit 15 may calculate the oscillation command Po(t) by the following formula (4), by setting the feed amount of the feed axis Az (cutting tool T) per one rotation of the spindle Ac as F (mm), and using the amplitude multiplying factor K.

$$Po(t) = (KF/2)\cos(\theta(t)) - (KF/2) \qquad (4)$$

The oscillation phase compensation unit 16 performs compensation of the oscillation phase θ(t) calculated by the oscillation phase calculation unit 13. For example, with advancing the oscillation phase at the side on which the trajectory of the position of the feed axis Az in the synthetic command becomes the convex upwards peak (in the range of 0 to 90 degrees and 270 to 360 degrees) and delaying the oscillation phase at the side on which the position of the feed axis Az in the synthetic command becomes the convex downwards valley (90 to 270 degrees in the oscillation phase), it becomes possible to make approach each other the phase of the spindle Ac at which the position of Az in the synthetic command becomes the apex of the peak (coordinates are maximum), and the phase of the spindle Ac at which becoming the lowest point of the valley (coordinates are minimum). In this way, by matching the rotational positions of the spindle Ac corresponding to the apex of the peak and the lowest point of the valley for the position of the feed axis Az, sawn lines formed in the cutting surface of the workpiece W will become unnoticeable. In addition, the determination of whether to advance or delay the oscillation phase may calculate an assumed command which is assumed as a synthetic command in the case of not performing compensation, then calculate the acceleration of the feed axis Az in the case of following the assumed command, and determine whether to advance or delay the oscillation phase based on this acceleration. With advancing the oscillation phase in the case of the acceleration being negative and delaying the oscillation phase in the case of being positive, it becomes possible to make approach each other the phase of the spindle Ac in which the position of Az in the synthetic command becomes the apex of the peak (coordinates are maximum) approach the phase of the spindle Ac at which becoming the lowest point of the valley (coordinates are minimum).

This compensation may be performed by adding the compensation amount $\Delta\theta(t)$ changing sinusoidally relative to time t, to the oscillation phase $\theta(t)$ calculated by the oscillation phase calculation unit 13. It is thereby possible to prevent the oscillation command from changing discontinuously, and therefore to prevent unnatural sawn lines from being newly formed due to compensation and machine vibration occurring. In this case, the oscillation phase compensation unit 16 may make the phase of the compensation amount $\Delta\theta(t)$ equal with the oscillation phase $\theta(t)$ calculated by the oscillation phase calculation unit 13. It is thereby possible to comparatively easily calculate the compensation amount which makes the rotational positions of the spindle corresponding to the apex of the peak and the lowest point of the valley for the position of the feed axis Az match.

More specifically, the oscillation phase compensation unit 16 can set the amplitude of the compensation amount $\Delta\theta(t)$ of sinusoidal shape as a value $(1/\pi KI)$ obtained by dividing 1 by the amplitude magnifying factor K, frequency magnifying factor I and circle ratio $\pi$. In other words, the compensation amount $\Delta\theta(t)$ of the oscillation phase $\theta(t)$ can be calculated by the following formula (5). By using such a computational expression, it is possible to more accurately make the rotational positions of the spindle Ac corresponding to the apex of the peak and the lowest point of the valley for the position of the feed axis Az match.

$$\Delta\theta(t)=1/\pi KI \cdot \cos(2\pi SI/60 \cdot t) \quad (5)$$

The command synthesizing unit 17 calculates the synthetic command Pc(t) (mm) for driving the feed axis Az, by superimposing the feed command calculated by the feed command calculation unit 12, and the oscillation command calculated by the oscillation command calculation unit 15. When using each of the aforementioned calculation formulas, it is possible to calculate by the following formula (6). As shown by formula (6), the feed command calculation unit 12, oscillation phase calculation unit 13, oscillation command calculation unit 15 and oscillation phase compensation unit 16 may exist as part of the calculation formulas of the command synthesizing unit 17.

$$Pc(t) = Ps(t) + Po(t) = \quad (6)$$
$$FS/60 \cdot t + (KF/2)\cos(\theta + \Delta\theta) - (KF/2) = FS/60 \cdot t +$$
$$(KF/2)\cos(2\pi SI/60 \cdot t + 1/\pi KI \cdot \cos(2\pi SI/60 \cdot t)) - (KF/2)$$

Herein, compensation of the oscillation phase by the oscillation phase compensation unit 16 will be explained in detail. When the position of the feed axis Az becomes the apex of the peak or lowest point of the valley, the derivative (slope of graph) of the synthetic command Pc(t) becomes "0". When following the aforementioned calculation formula, the synthetic command Pc(t) in the case of not performing compensation by the oscillation phase compensation unit 16 becomes the following formula (7).

$$Pc(t)=FS/60 \cdot t+(KF/2)\cos(2\pi SI/60 \cdot t)-(KF/2) \quad (7)$$

When differentiating the synthetic command Pc(t) of formula (7), it becomes the following formula (8).

$$Pc(t) \cdot t/dt=FS/60 \cdot (1-\pi KI \sin(2\pi SI/60 \cdot t)) \quad (8)$$

When establishing the value of this derivative $Pc(t) \cdot t/dt$ as "0", the relationship of the following formula (9) with $2\pi SI/60 \cdot t=n\pi+1/\pi KI \cdot (-1)^n$ is derived (n is an integer). For this reason, by advancing the oscillation phase when the position of the feed axis Az becomes the apex of the peak by $1/\pi KI \cdot 2n\pi$, and delaying the oscillation phase when the position of the feed axis Az becomes the lowest point of the valley by $1/\pi KI \cdot (2n+1)\pi$, it is possible to make the phases of the spindle Ac match the positions of the feed axis Az at the apex of the peak and at the lowest point of the valley. For this reason, it is sufficient if the compensation amount $\Delta\theta(t)$ of the oscillation phase $\theta(t)$ is $+1/\pi KI$, when the position of the feed axis Az becomes the apex of the peak, i.e. when the oscillation phase $\theta(t)$ after compensation becomes 0, and is $-1/\pi KI$ when the oscillation phase $\theta(t)$ after compensation becomes $\pi$ and the position of the feed axis Az becomes the lowest point of the valley.

$$2\pi SI/60 \cdot t=n\pi+1/\pi KI \cdot (-1)^n \quad (9)$$

According to the above, the oscillation command calculation unit 15 may set the oscillation command Po(t) as the following formula (10). As shown by formula (10), the oscillation phase compensation unit 16 may exist as a part of the calculation formulas of the oscillation command calculation unit 15.

$$Po(t)=(KF/2)\cos((2\pi S/60) \cdot I \cdot t+\cos(2\pi S/60 \cdot I \cdot t)/\pi KI)- (KF/2) \quad (10)$$

The position speed control unit 18 converts the command signal into the rotational speed of the feed axis motor Mz. The configuration of such a position speed control unit 18 is a well-known configuration; therefore, a detailed explanation will be omitted.

The current control unit 19 controls the electrical current applied to the feed axis motor Mz, so that the feed axis motor Mz is made to rotate at the rotational speed calculated by the position speed control unit 18. The current control unit 19 can be established as a well-known servo amplifier which performs vector control, for example.

The position deviation calculation unit 20 calculates the deviation between the position of the feed axis motor Mz indicated by the current feed command, and the actual position fed back from the feed axis motor Mz.

The integrator 21 integrates the positional deviation calculated by the positional deviation calculation unit 20.

The learning controller 22 calculates the command compensation value to the position speed control unit 18, from a past positional deviation.

The learning compensation value adding unit 23 adds the compensation value calculated by the learning controller 22 to the movement command for the position speed control unit 18.

The oscillation amplitude compensation unit can change the value of the constant K for preventing a decrease in the oscillation amplitude by the change in oscillation phase occurring by adding the compensation calculated by the oscillation phase compensation unit 16 to the oscillation phase.

Figure 3:
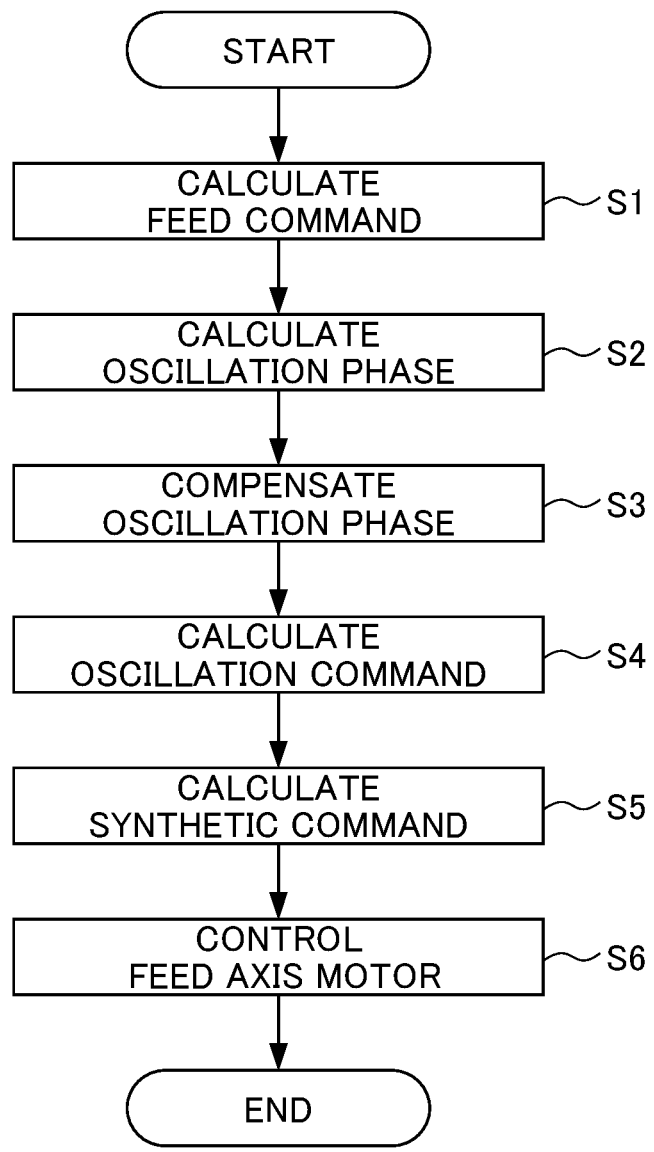
FIG. 3 is a flowchart showing the sequence of control in the numerical control device of FIG. 1.

Furthermore, FIG. 3 shows the sequence of control of the feed axis Az by the numerical control device 1. This control sequence is an embodiment of a machine tool control method according to the present invention. The numerical control device 1 performs control of the spindle Ac and cut-in axis Ax synchronously with the control of the feed axis Az; however, since the control of drive axes other than the feed axis Az are similar to conventional, a detailed explanation will be omitted.

The control of the feed axis Az by the numerical control device 1 includes: a step of calculating a feed command of the feed axis Az (Step S1: feed command calculation step); a step of calculating the oscillation phase (Step S2: oscillation phase calculation step); a step of compensating the oscillation phase (Step S3: oscillation phase compensation step); a step of creating an oscillation command based on the compensated oscillation phase (Step S4: oscillation command calculation step); a step of calculating a synthetic command by superimposing the feed command and the oscillation command (Step S5: synthetic command calculation step); and a step of controlling a feed axis motor Mz in accordance with the synthetic command (Step S6: motor control step).

In the feed command calculation step of Step S1, the feed command Ps(t) of the feed axis Az is calculated based on the feed amount of the feed axis Az and rotation speed of the spindle Ac designated in the machining program, by the feed command calculation unit 12.

In the oscillation phase calculation step of Step S2, the oscillation phase θ(t) serving as the reference for the reciprocating motion component of the feed axis Az is calculated by the oscillation phase calculation unit 13.

In the oscillation phase calculation step of Step S3, the compensation amount of the oscillation phase is calculated and added to the oscillation phase θ(t) calculated by the oscillation phase calculation unit 13, by the oscillation phase compensation unit 16.

In the oscillation command calculation step of Step S4, the oscillation command Po(t) is calculated by the oscillation command calculation unit 15.

In the synthetic command calculation step of Step S5, the synthetic command Pc(t) is calculated by summing the Ps(t) and oscillation command Po(t) by the command synthesizing unit 17.

In the motor control step of Step S6, compensation by the learning controller 22 is taken into account so as to control the feed axis motor Mz, by the position speed control unit 18 and current control unit 19.

Figure 4:
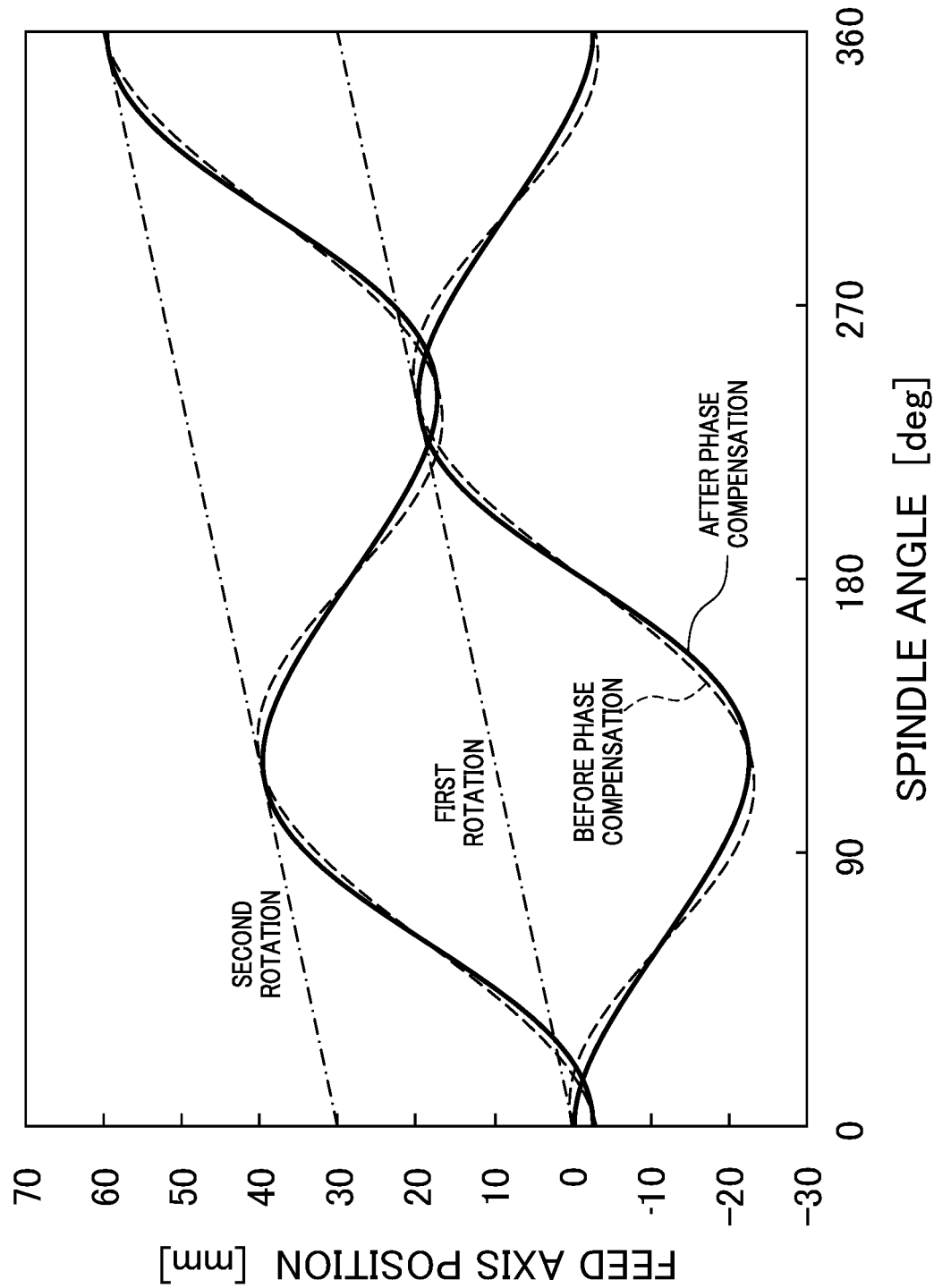
FIG. 4 is a graph exemplifying the time change of commands for tool position generated by the numerical control device of FIG. 1.

FIG. 4 shows the change in the position of the feed axis Az relative to the rotation angle of the spindle Ac, i.e. the trajectory of the cutting tool T in the machining surface of the workpiece W, in the synthetic command calculated based on the oscillation phase prior to compensation, and the synthetic command calculated based on the oscillation phase after compensation, and the feed command. In the drawing, the feed command is shown by the one-dot dashed line, the synthetic command before oscillation phase compensation is shown by a dashed line, and the synthetic command after oscillation phase compensation is shown by a solid line.

As illustrated, in the case of not performing compensation of the oscillation phase, the rotation angle from the angular position of the spindle Ac at which the position of the feed axis Az becomes the lowest point of the valley until the angular position of the spindle Ac at which the position of the feed axis Az becomes the apex of the peak becomes larger than the rotational angle from the angular position of the spindle Ac at which the position of the feed axis Az becomes the apex of the peak until the angular position of the spindle Ac at which the position of the feed axis Az becomes the lowest point of the valley. On the other hand, with the synthetic command calculated based on the compensated oscillation phase, the angular position of the spindle Ac at which the position of the feed axis Az becomes the apex of the peak in the first rotation, and the angular position of the spindle Ac at which the position of the feed axis Az becomes the lowest point of the valley in the second rotation more accurately match.

In this way, the numerical control device 1 causes the angular position of the spindle Ac at which the position of the feed axis Az becomes the apex of the peak and the angular position of the spindle Ac at which the position of the feed axis Az becomes the lowest point of the valley to relatively accurately match; therefore, it is possible to perform oscillation cutting in which sawn lines are hardly noticeable.

It should be noted that, in the case of using the numerical control device 1 of the present embodiment including the oscillation phase compensation unit 16, the time for which the cutting tool T is distanced from the workpiece W becomes short compared to a case of conventional oscillation cutting, as shown in FIG. 4, by the action of the oscillation phase compensation unit 16. For this reason, with the numerical control device 1 of the present embodiment, it is preferable to set the value of the oscillation amplitude magnifying factor K to slightly larger.

Figure 5:
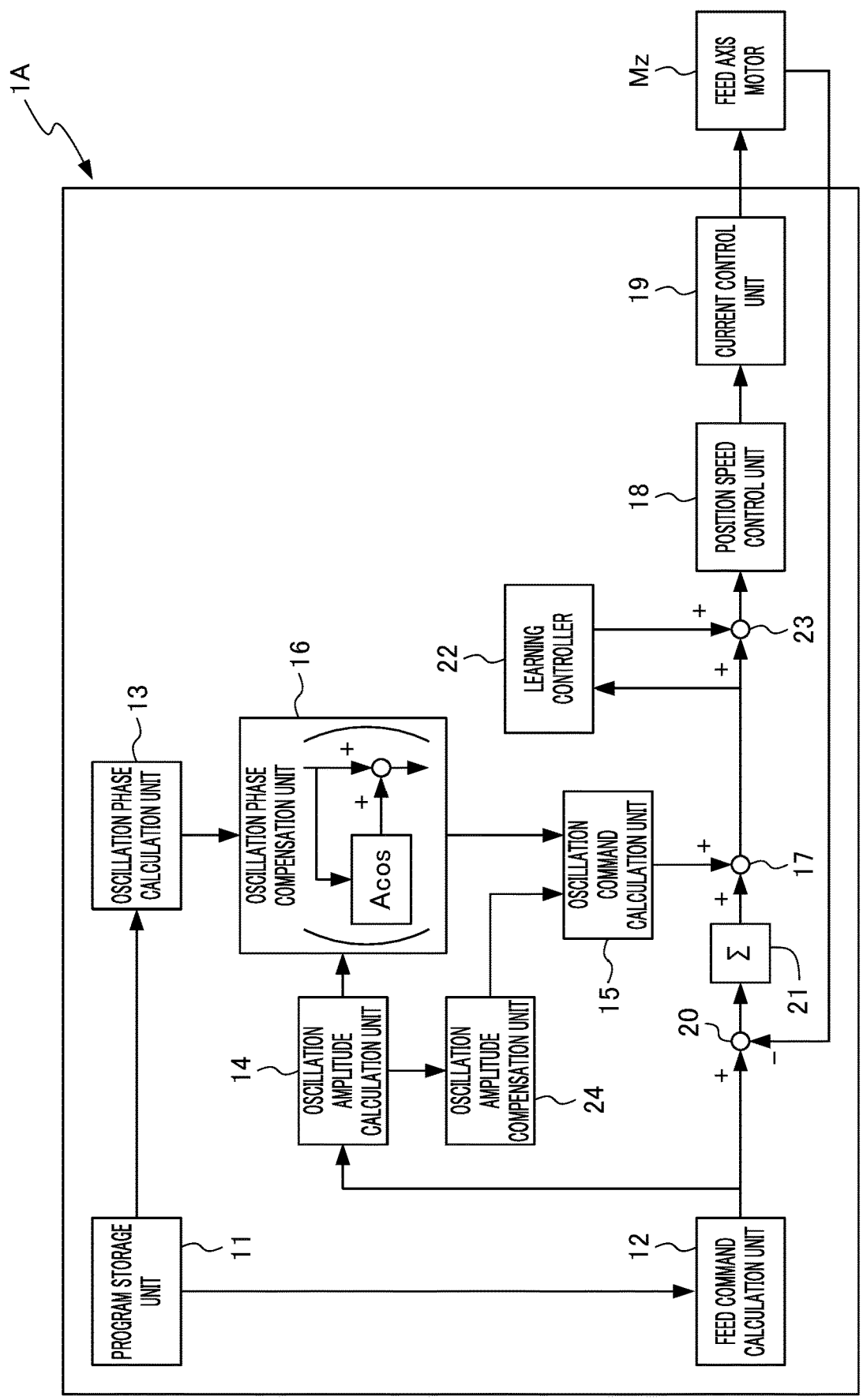
FIG. 5 is a block diagram showing the configuration and flow of signals of a numerical control device according to a second embodiment of the present disclosure.

Next, FIG. 5 shows a numerical control device 1A which can be used in place of the numerical control device 1 of FIG. 2 in the machine tool 100 of FIG. 1. The numerical control device 1A of FIG. 5 is a second embodiment of a numerical control device according to the present invention. For the numerical control device 1A of FIG. 5, the same reference symbols are assigned to constituent elements shared with the numerical control device 1 of FIG. 1, and redundant explanations may be omitted.

The numerical control device 1A includes: a program storage unit 11 which stores machining programs; a feed command calculation unit 12 which calculates a feed command causing the feed axis Az to move; a oscillation phase calculation unit 13 which calculates an oscillation phase that is a phase of oscillation of the feed axis Az based on the rotation number of the spindle Ac; an oscillation amplitude calculation unit 14 which calculates the amplitude of oscillation causing the feed axis to reciprocally move; an oscillation command calculation unit 15 which calculates an oscillation command causing the feed axis Az to reciprocally move periodically based on the oscillation phase; an oscillation phase compensation unit 16 which compensates an oscillation phase calculated by the oscillation phase calculation unit 13; and an oscillation amplitude compensation unit 24 which compensates the oscillation amplitude calculated by the oscillation amplitude calculation unit. Furthermore, the numerical control device 1A includes a position speed control unit 18, a current control unit 19, a position deviation calculation unit 20, an integrator 21, a learning controller 22 and a learning compensation value addition unit 23.

In the numerical control device 1A, the oscillation command calculation unit 15 calculates the oscillation command, based on the oscillation phase after compensation by the oscillation phase compensation unit 16, and the oscillation amplitude after compensation by the oscillation amplitude compensation unit 24. In the case of compensating the oscillation phase by the oscillation phase compensation unit 16, although it is possible to make the sawn lines hardly noticeable compared to a case of not compensating the oscillation phase, since the time for which the trajectory of the position of the feed axis Az overlaps, i.e. time for which the cutting tool T is separated from the workpiece W, becomes shorter, there is concern over the cutting of shavings becoming uncertain. However, the numerical control device 1A has the oscillation amplitude compensation unit 24, and can reliably shred shavings, due to being able to compensate the oscillation amplitude so that the time for which the cutting tool T separates from the workpiece W does not shorten, even if compensating the oscillation phase by the oscillation phase compensation unit 16.

Although embodiments of the present disclosure have been explained above, the present invention is not to be limited to the aforementioned embodiments. In addition, the effects described in the present embodiment are merely listing the most preferred effects produced from the present invention, and the effects according to the present invention are not limited to those described in the present embodiment.

The compensation amount of the oscillation phase in the numerical control device according to the present disclosure is not limited to sine wave form, and is sufficient so long as changing periodically and continuously, for example, may be set as a value which changes linearly by alternately connecting an upwardly convex arc and a downwardly convex arc. In addition, the amplitude of the compensation amount of the oscillation phase may be designated by the user based on experience, for example.

In addition, the numerical control device according to the present disclosure is not limited to a lathe, and is also applicable to the control of various other machine tools such as a drilling machine, for example.

EXPLANATION OF REFERENCE NUMERALS 1, 1A numerical control device
11 program storage unit
12 feed command calculation unit
13 oscillation phase calculation unit
14 oscillation amplitude calculation unit
15 oscillation command calculation unit
16 oscillation phase compensation unit
17 command synthesizing unit
18 position speed control unit
19 current control unit
20 position deviation calculation unit
21 integrator
22 learning controller
23 learning compensation value adding unit
24 oscillation amplitude compensation unit
100 machine tool
AC spindle
Az feed axis
T cutting tool
W workpiece

What is claimed is:

1. A machine tool control device which controls a machine tool having a spindle and a feed axis, wherein the spindle relatively rotates a cutting tool and a workpiece, the feed axis relatively moves the cutting tool and the workpiece, and the machine tool cuts the workpiece by cooperatively operating the spindle and the feed axis, the control device comprising:

a feed command calculation unit which calculates a feed command for moving the feed axis relative to the workpiece;

an oscillation phase calculation unit which calculates an oscillation phase that is a phase of oscillation for reciprocally moving the feed axis based on number of rotations of the spindle;

an oscillation phase compensation unit which compensates the oscillation phase;

an oscillation amplitude calculation unit which calculates an oscillation amplitude that is an amplitude of oscillation for reciprocally moving the feed axis based on the feed command;

an oscillation command calculation unit which calculates an oscillation command for reciprocally moving the feed axis based on the oscillation amplitude and the oscillation phase after the compensation of the oscillation phase by the oscillation phase compensation unit; and a command synthesizing unit which calculates a synthetic command for driving the feed axis by superimposing the feed command and the oscillation command, wherein the oscillation phase compensation unit advances the oscillation phase when a position of the feed axis in the synthetic command is in an upwardly convex range of a trajectory of the feed axis and delays the oscillation phase when the position of the feed axis in the synthetic command is in a downwardly convex range of the trajectory of the feed axis.

2. The machine tool control device according to claim 1, wherein the oscillation phase compensation unit compensates the oscillation phase based on the oscillation amplitude and the oscillation phase that has not been compensated.

3. The machine tool control device according to claim 1, wherein the oscillation phase compensation unit calculates an assumed command which is assumed as the synthetic command if the oscillation phase compensation unit is not compensating the oscillation phase based on the oscillation amplitude, the oscillation phase that has not been compensated, and the feed command, calculates acceleration of the feed axis when the feed axis is moved in accordance with the assumed command, and determines whether to advance or delay the oscillation phase based on the acceleration.

4. The machine tool control device according to claim 1, wherein the oscillation phase calculation unit calculates the oscillation phase as a value that is proportional to time, and wherein the oscillation phase compensation unit adds a compensation amount of oscillation phase changing sinusoidally as a function of time to the oscillation phase calculated by the oscillation phase calculation unit.

5. The machine tool control device according to claim 4, wherein the oscillation phase compensation unit sets the phase of the compensation amount equal to the oscillation phase calculated by the oscillation phase calculation unit.

6. The machine tool control device according to claim 1, further comprising an oscillation amplitude compensation unit which compensates the oscillation amplitude, wherein the oscillation command calculation unit calculates the oscillation command based on the compensated oscillation phase and the compensated oscillation amplitude, wherein the compensated oscillation phase is obtained after the compensation of the oscillation phase by the oscillation phase compensation unit and the compensated oscillation amplitude is obtained after the compensation of the oscillation amplitude by the oscillation amplitude compensation unit.

7. A machine tool control method for controlling a machine tool having a spindle and a feed axis, wherein the spindle relatively rotates a cutting tool and a workpiece, the feed axis relatively moves the cutting tool and the workpiece, and the machine tool cuts the workpiece by cooperatively operating the spindle and the feed axis, the method comprising the steps of:

calculating a feed command for moving the feed axis relative to the workpiece;

calculating an oscillation phase that is a phase of oscillation for reciprocally moving the feed axis based on number of rotations of the spindle;

compensating the oscillation phase;

calculating an oscillation command for reciprocally moving the feed axis based on the oscillation phase after the compensation of the oscillation phase in the step of compensating the oscillation phase;

calculating a synthetic command for driving the feed axis by superimposing the feed command and the oscillation command; and advancing the oscillation phase when a position of the feed axis in the synthetic command is in an upwardly convex range of a trajectory of the feed axis and delaying the oscillation phase when the position of the feed axis in the synthetic command is in a downwardly convex range of the trajectory of the feed axis.

* * * * *